Aug. 5, 1969  R. R. GROVER  3,459,069
DRIVE TRANSMISSION FOR MACHINE TOOLS
Filed May 19, 1967  5 Sheets-Sheet 1
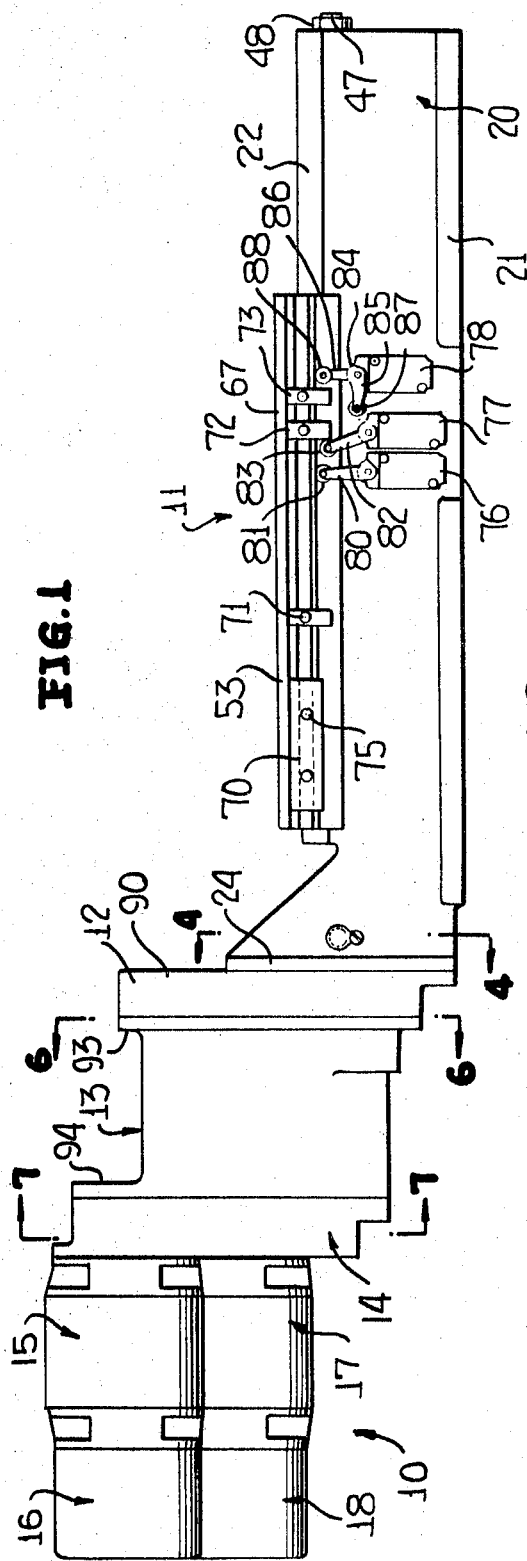
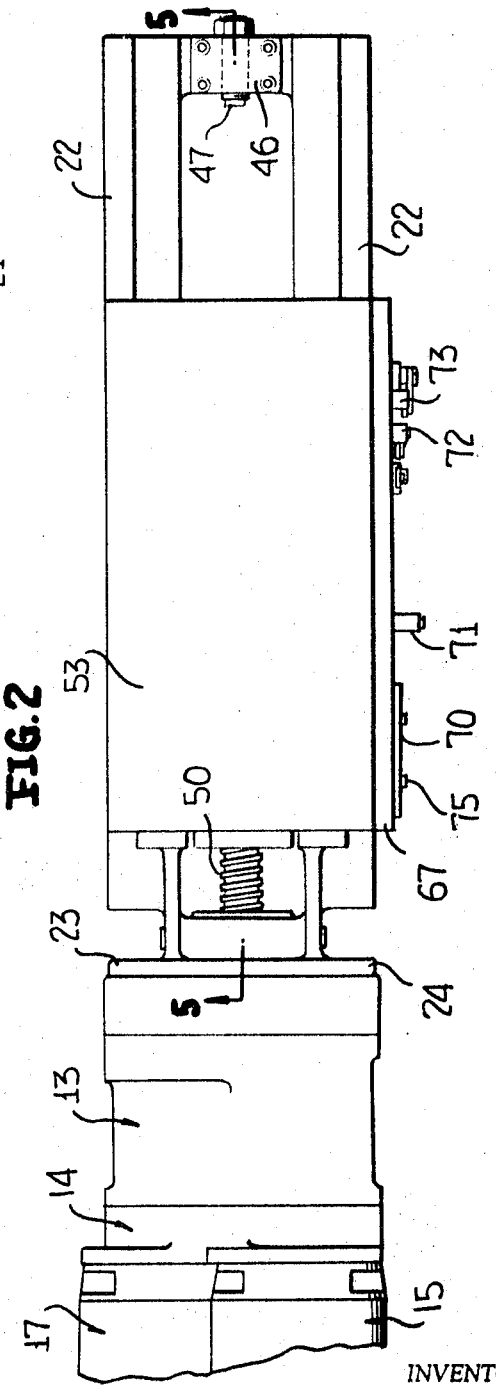
INVENTOR
ROBERT R. GROVER
BY Mason, Porter, Willer & Brown
ATTORNEYS Aug. 5, 1969 R. R. GROVER 3,459,069
DRIVE TRANSMISSION FOR MACHINE TOOLS
Filed May 19, 1967 5 Sheets-Sheet 4
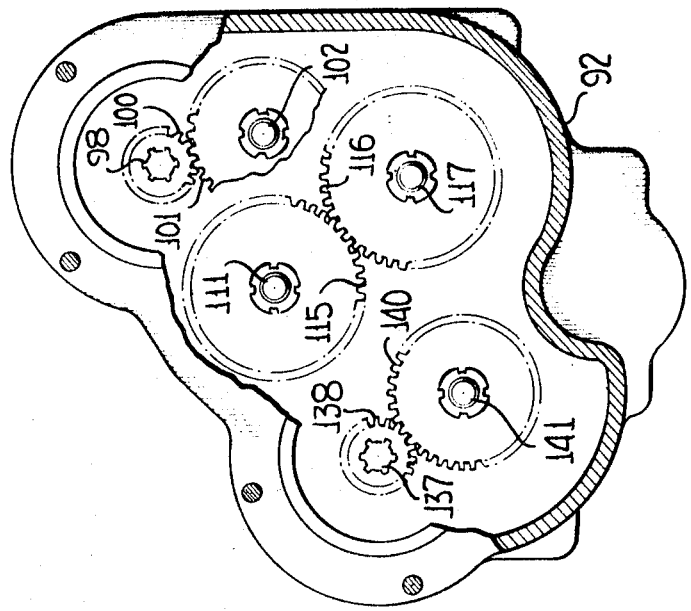
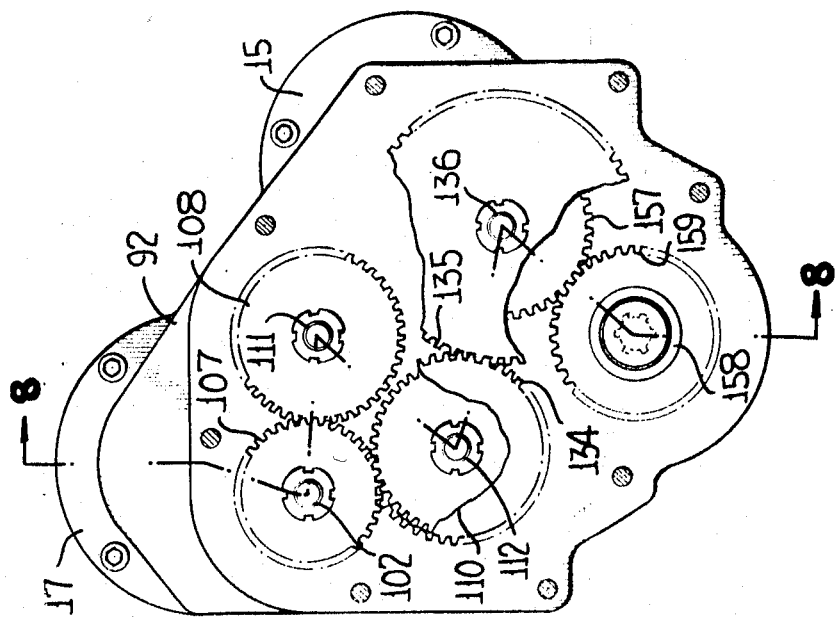
INVENTOR
ROBERT R. GROVER
BY Mason, Porter, Diller & Brown
ATTORNEYS

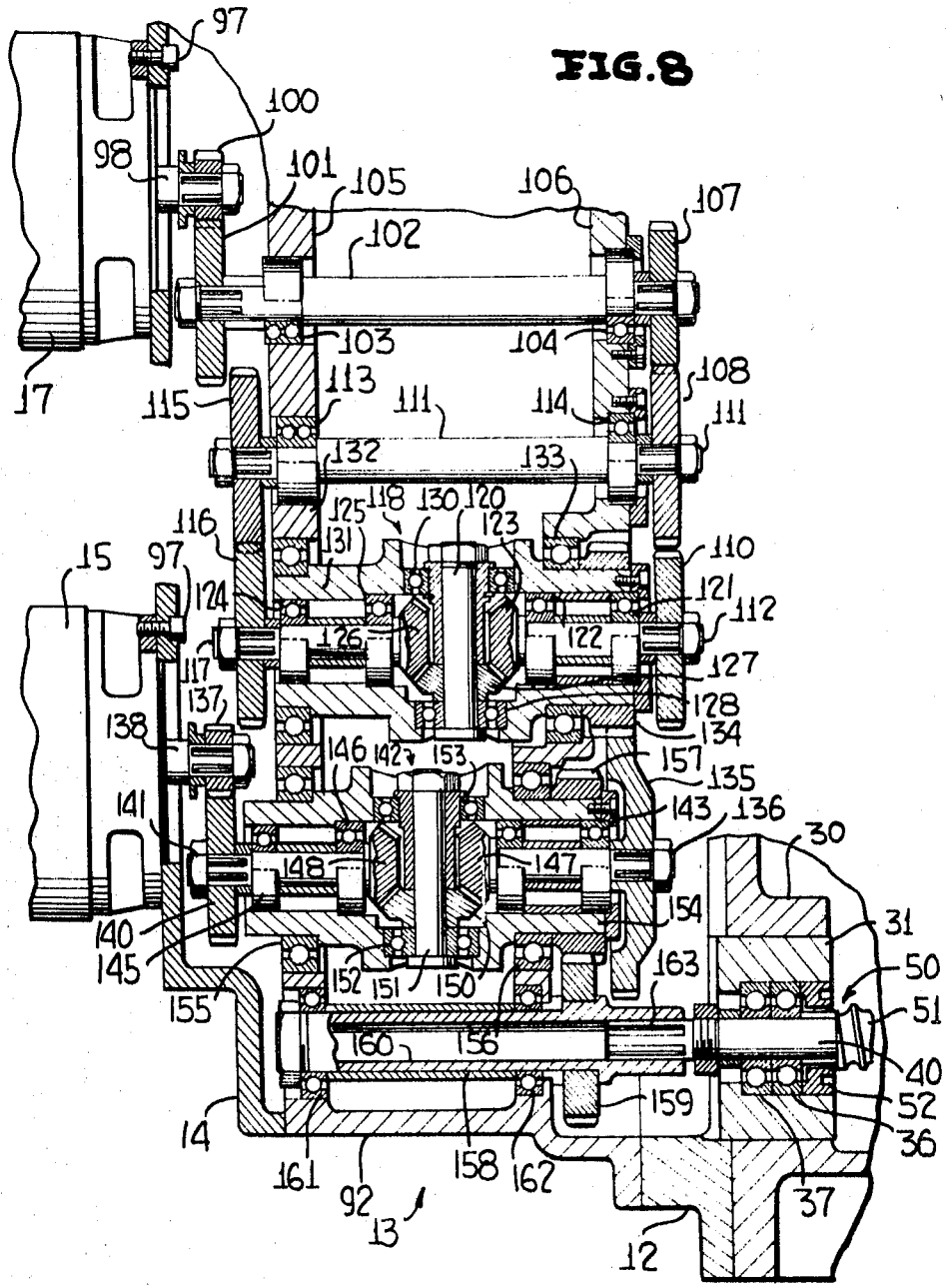

United States Patent Office 3,459,069
Patented Aug. 5, 1969

3,459,069
DRIVE TRANSMISSION FOR MACHINE TOOLS
Robert R. Grover, Westport, N.H., assignor to Kingsbury Machine Tool Corporation, Keene, N.H., a corporation of Delaware
Filed May 19, 1967, Ser. No. 639,884
Int. Cl. F16h *37/06, 57/10;* B23b *39/10*
U.S. Cl. 74—675
9 Claims

ABSTRACT OF THE DISCLOSURE

This disclosure relates to a drive transmission for a feed slide of a machine. The feed slide is moved longitudinally along a lead screw through a recirculating ball screw nut, and a stopping device is provided to prevent over-travel of the feed slide at the end of the lead screw. The lead screw is adapted for selective rapid or fine feed from corresponding rapid or fine feed motors, through dual drive means. Range gears are provided to determine a fine feed ratio, and change gears are also provided to effect minor ratio changes within the fine feed range. Adjustable limit switches are also provided, associated with the movement of the feed slide along the lead screw, to selectively actuate rapid and fine feed motors, and their corresponding brakes, as desired, in order to utilize desired gearing of the dual drive means.

---

This invention relates to providing a two drive means for a lead screw feed slide, and other machine devices, wherein rapid, efficient, and automatic speed changes are desirable.

Multiple speed transmission devices of the prior art types, which are adapted for turning lead screws and other rotatable machine elements are generally inefficient in that conventional worm and worm gearing means are utilized to obtain a desired large ratio reduction, with a plurality of motors operative through the use of clutches or the like, in order to activate the desired motor for turning the worm. This type of drive mechanism is relatively inefficient and a substantial portion of the energy applied to the worm is transformed into heat, which undesirably heats the lubricating medium being used with the transmission.

Additionally, the usual worm and worm gearing arrangement requires that axes of adjacent rotatable parts be perpendicular to each other thereby requiring relatively expensive machining operations, as well as assembly difficulties.

The present invention seeks to obviate the above and other undesirable features of the prior art in providing dual drive means to provide both a rapid and a fine feed for a lead screw, and consequently for a feed slide carried by the lead screw, wherein drive torque is provided from a selected rapid or fine feed motor, as desired, the drive torque being transmitted entirely through gearing, the gearing having been selected to achieve the desired reduction ratio between each of the rapid and fine feed drive motors and the drive shaft for the lead screw. Two drive means are utilized, relatively rotatable to each other, and idler gear means associated with and carried by a corresponding rotatable gear casing, whereby relative rotation between the drive gear means provides a desired speed reduction through the idler gear means and the rotating gear casing.

Accordingly, it is a primary object of this invention to provide a torque transmission device for receiving one of a plurality of input drives at various input speeds, and rotating an output drive at a speed determined by the selected input drive, utilizing two drive means.

It is a further object of this invention to provide a dual drive transmission for receiving rapid and fine fed drives from respective rapid and fine feed motors, and for delivering to the output shaft of the transmission torque at a predetermined reduced speed, depending upon the speed of the drive motor, wherein the transmission utilizes corresponding rapid and fine feed drive mechanisms, which are inter-connected, and wherein portions of one of the mechanisms are partially fixed against rotation during a braking of its associated motor drive and operation of the other motor drive and its corresponding drive mechanism.

It is a further object of this invention to provide a torque transmission device utilizing two drive gear mechanisms to drive an output shaft at a speed determined by one of a pair of selected motor drives, wherein selected pairs of gears are provided for determining the range of the gear ratio, as well as minor changes within the gear ratio.

It is a further object of this invention to provide a lead screw drive transmission adapted to drive the lead screw at either of a rapid or fine feed, from selected drive motors, wherein the transmission includes two drive means.

It is yet another object of this invention to provide a lead screw drive apparatus including two drive means, operative when driven by a selected one of rapid and fine feed motors, each of the motors having braking means provided, and wherein the gearing is operative to provide a desired speed reduction to a lead screw, the lead screw having rapid and fine feed, the motors and their corresponding braking means which provide the rapid and fine feed being automatically actuated by limit switches which determine the desired rotation of the lead screw depending upon the position of a feed slide along the lead screw at any given time.

It is a further object of this invention to provide a dual drive transmission for selectively rotating a lead screw which is operative to move a feed slide through a recirculating ball screw nut, and wherein stopping means are provided at opposite ends of the feed slide.

With the above and other objects in view that will hereinafter appear, the nature of the invention will be more clearly understood by reference to the following detailed description, the appended claims and the several views illustrated in the accompanying drawings:

In the drawings:

FIGURE 1 is a front elevational view of a machine tool of this invention, wherein the over-all arrangement of rapid and fine feed motor, transmission, machine base, feed slide, and actuating means are illustrated.

FIGURE 2 is a fragmentary top plan view of the machine illustrated in FIGURE 1.

FIGURE 6 is an enlarged vertical sectional view, with portions broken away for clarity, taken generally along the line 6—6 of FIGURE 1, and wherein a portion of the transmission of this invention is illustrated.

FIGURE 7 is an enlarged vertical sectional view, with portions broken away for clarity, taken generally along the line 7—7 of FIGURE 1, and wherein other portions of the transmission of this invention are illustrated.

FIGURE 8 is an enlarged fragmentary vertical sectional view through the transmission of this invention, taken generally along the line 8—8 of FIGURE 6, and wherein the two drive means mechanisms are best illustrated.

Figure 3:
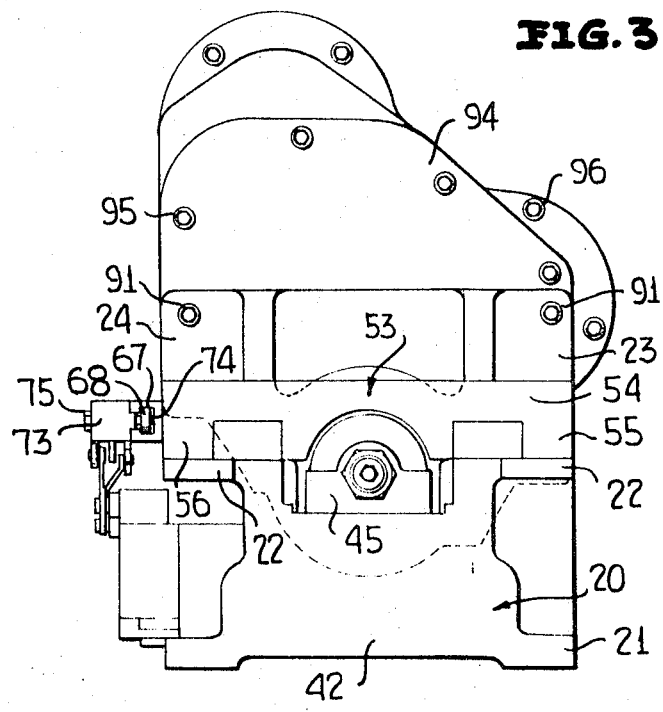
FIGURE 3 is an enlarged right end view of the machine illustrated in FIGURE 1, wherein cams carried by the feed slide and limit switches mounted on the base member which comprise the actuating means are best illustrated.

Referring now to the drawings in detail, reference is first made to FIGURE 1, wherein there is illustrated the machine tool 10 of this invention, comprising a feed portion 11, a body adaptor portion 12, a transmission portion 13, a motor adaptor portion 14, a fine feed motor 17, a fine feed motor brake 18, a rapid feed motor 15, and a rapid feed motor brake 16.

The feed portion 11 comprises a base 20 formed by a casting or the like process, and having lower supporting leg portions 21 and upper slide support portions 22. End flanges 23 and 24 are provided on opposite sides of the base portion 20. Between lower feet portions 21 and upper slide support portions 22 are opposite wall portions 25 and 26, vertically upstanding on opposite sides of a bottom wall portion 27, sidewalls and bottom wall portions cooperating to define a generally U-shaped void 28 in section across the base 20.

Figure 4:
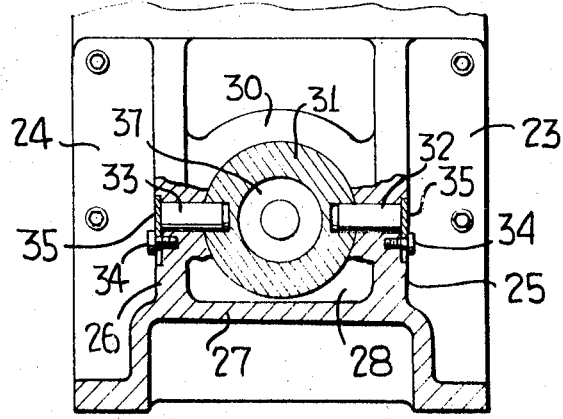
FIGURE 4 is an enlarged fragmentary vertical sectional view taken along the line 4—4 of FIGURE 1, wherein there is illustrated trunion pins for retaining the position of the lead screw trunion housing.

The flange portions 23 and 24 cooperate to define a sleeve 30 therebetween, in which is located a trunion housing 31. With particular reference to FIGURE 4, it is seen that trunion pins 32 and 33 are provided, extending through associated respective wall portions 25 and 26 of the base 20, for engagement with the trunion housing 31, and to retain the same in position. The trunion pins 32 and 33 are retained in position by screws 34, the heads of which engage portions of the heads 35 of the pins 32 and 33, to retain the pins in position. Anti-friction bearings 36 and 37 are provided, secured within a bore 38 of the trunion housing 31, by means of a threaded clamping member 40 tightening the bearings 36 and 37 against an abutment portion 41 of the trunion housing 31.

Figure 5:
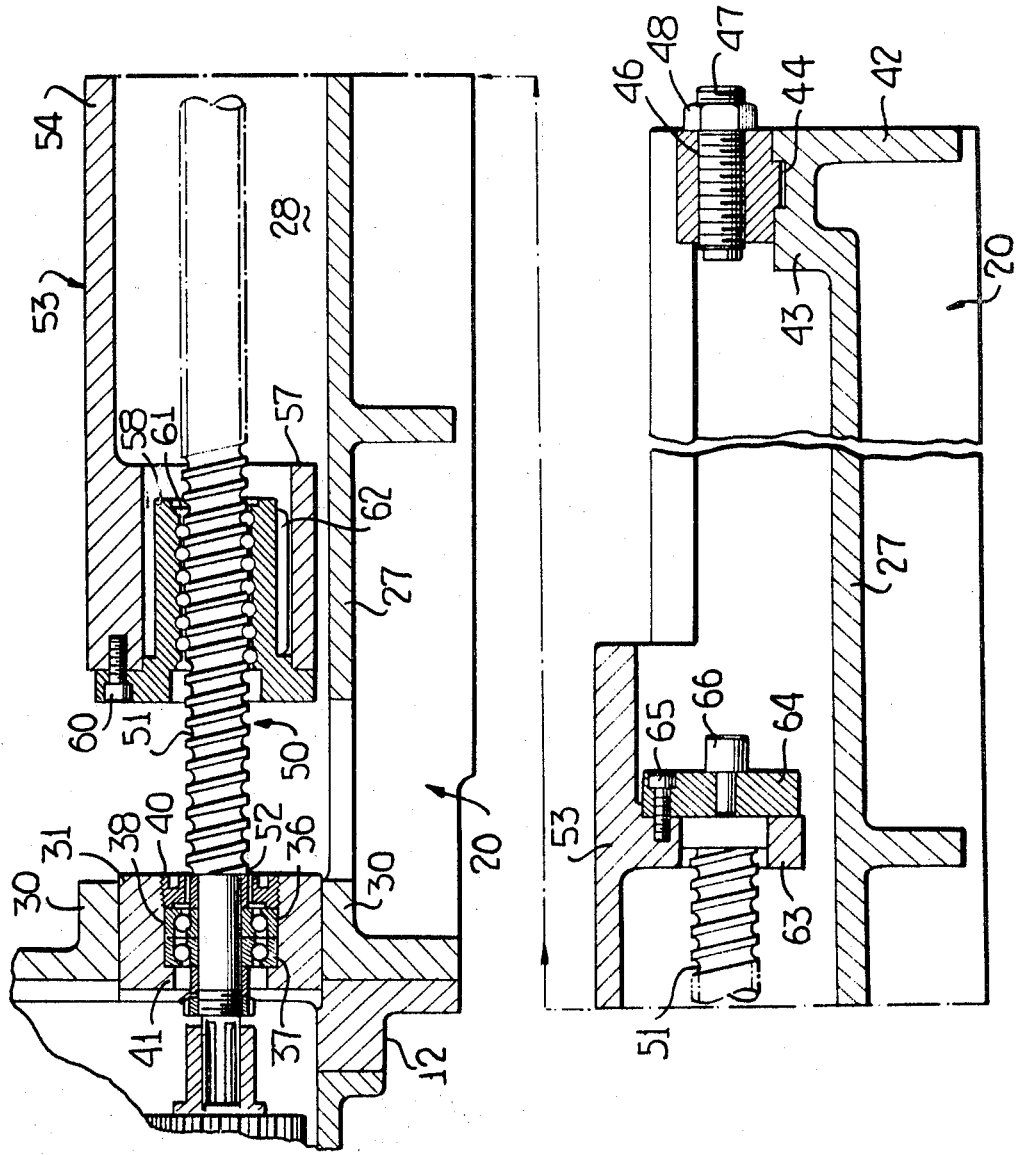
FIGURE 5 is an enlarged fragmentary interrupted vertical sectional view of the machine tool of this invention, taken along the line 5—5 of FIGURE 2, wherein the mounting for the lead screw, the recirculating ball screw nut mounting for the feed slide and the over-travel stop means are best illustrated.

With particular reference to FIGURE 5, the base member 20 is seen to include an end wall 42, which cooperates with bottom wall 27, to define an upstanding ledge portion 43. A slot 44 is provided transversely of the ledge 43, in which is positioned an upstanding abutment boss 45. The abutment boss 45 is internally threaded at 46, and is provided with a threaded stop pin 47, locked therein by means of a nut 48.

A lead screw 50 is provided, having a threaded portion 51, and a shaft portion 52 in press-fit engagement with the inner races of the bearings 36 and 37.

A feed slide 53 is carried by the base portion 20, for longitudinal movement relative thereto. The feed slide 53 includes a flat upper plate member 54 and depending slide legs 55 and 56, adapted for sliding relation on the slide support portions 22 of the base 20. At the left end of the feed slide 53, as viewed in FIGURE 5, it is seen that the feed slide 53 is provided with a generally cylindrical trunion portion 57, in which is mounted a recirculating ball bearing nut 58, by means of screw type fasteners 60. Balls 61, associated with the ball bearing nut 58 are recirculated through the channel portion 62, between opposite ends of the nut 58. The threaded portion 51 of the lead screw 50 extends through the recirculating ball bearing nut 58, for relative movement of the feed slide 53 and lead screw 50.

At the right end of the feed slide 53, as viewed in FIGURE 5, a depending cylindrical support portion 63 is provided, to which is attached a stop plate 64, by means of screws 65. A stop button 66 is secured to the stop plate 64, as by press-fitting. Upon extreme rightward movement of the feed slide 53, and consequently of the stop button 66, the stop button 66 is adapted to contact the innermost end of the stop pin 47, carried by the base portion 20.

The feed slide 53 is provided along one side thereof (FIGURE 1) with a cam adaptor 67, in which a longitudinal slot 68, of "T" configuration is provided, between the ends thereof. A plurality of cams 70, 71, 72 and 73 are provided, secured to the adaptor 67, by means of associated slot nuts 74, secured within the T slot 68 of the adaptor 67, by means of screws 75. Limit switches 76, 77, and 78 are mounted on the base member 20, as illustrated in FIGURE 1. The limit switch 76 carries a lever arm 80 and a roller 81. Similarly, limit switch 77 carries a lever arm 82 with a roller 83 mounted thereon. The limit switch 78 carries a fork lever arm 84, having forked portions 85 and 86, upon which are respectively mounted rollers 87 and 88.

The cams 70 through 73 protrude outwardly, as viewed in FIGURE 2, from the adaptor 67, different distances, and extend vertically downwardly, as viewed in FIGURE 1, varying degrees, for the purpose of selectively contacting desired ones of the rollers 81, 83, 87 and 88, for actuation of the limit switches 76, 77 and 78, during longitudinal movement of the feed slide 53 along the lead screw 50, in a manner later to be described.

The body adaptor 12 comprises a housing 90, secured to the base member 20 by bolts 91 extending through the flanges 23 and 24, and secured within the housing 90.

The transmission 13 includes a transmission housing 92 and end flanges 93 and 94 secured respectively, to the body adaptor 12 and motor adaptor 14, by means of bolts 95 and 96 respectively.

The rapid and fine feed motors 15 and 17 respectively are secured to the motor adaptor 14 by bolts 97. Referring now to FIGURES 6 through 8, it is seen that the fine feed motor 17 is provided with a motor shaft 98 on which is mounted a change gear 100 in mesh with a mating change gear 101 mounted on a shaft 102. The shaft 102 is rotatably journalled in bearings 103 and 104, which are housed, respectively, in housing wall portions 105 and 106. A gear 107 is also mounted on the shaft 102, at the right end thereof as viewed in FIGURE 8, for rotation therewith. The gear 107 is in mesh with gears 108 and 110 carried respectively by shafts 111 and 112. The shaft 111 is journalled in bearings 113 and 114 which are also housed in respective wall portions 105 and 106. The gears 108 and 110 both have the same number of teeth, and being driven by the gear 107 will cause the shafts 111 and 112 to be rotated in the same direction at the same speed.

The left end of the shaft 111, as viewed in FIGURE 8, carries a range gear 115, which is in mesh with a mating range gear 116 on a differential pinion shaft 117 of a fine feed differential generally designated by the numeral 118. The differential pinion shafts 112 and 117 are thus driven in opposite directions, and if the range gears 115 and 116 are provided with the same number of teeth, the shafts 112 and 117 are driven at the same speed in different directions, thereby leaving differential idler shaft 120 relatively immobile. Thus, the range gears 115 and 116 are selected, having different numbers of teeth, in order to provide a relative rotation at different speeds between the shafts 112 and 117, thereby realizing a mechanical advantage for the differential 118. The range gears 115 and 116 thus can be used to set up a pre-selected fine feed ratio.

The shaft 112 is journalled in bearings 121 and 122 and carries a bevel pinion gear 123 at an inner end thereof. Similarly, the shaft 117 is journalled in bearings 124 and 125 and carries a bevel pinion gear 126 at an inner end thereof. The bevel gears 123 and 126 are in mesh with a bevel idler gear 127 carried by the idler shaft 120. The idler shaft 120 is journalled in a pair of bearings 128 and 130, for rotation therein. The bearings 121, 122, 124, 125, 128 and 130 are all mounted in a differential gear casing 131, which is, in turn, journalled in a pair of bearings 132 and 133 carried by the wall portions 105 and 106.

Thus, upon the shaft 98 driving the gear 100, in mesh with gear 101, the gear 107 is driven, which in turn drives the gears 108 and 110. The gear 108 drives the shaft 111, which in turn, drives the gear 115. Because the gears 115 and 116 normally have different numbers of teeth, and the gear 115 drives the gear 116, the shafts 112 and 117 are rotated in different directions at different relative speeds, depending upon the tooth differential between the range gears 115 and 116. Upon driving the shafts 112 and 117 in the above-described manner, the bevel pinion gears 123 and 126 are also thus driven, the difference in the rotational speeds of the gears 123 and 126 in their opposite directions, being transferred to the bevel idler gear 127, thereby driving the idler gear 127 at a predetermined rate of speed depending upon the difference in the number of teeth in the range gears 115 and 116. As the bevel idler gear 127 is rotated with the shaft 120, it is also rotated about a common axis of the shafts 112 and 117, thereby rotating the fine feed differential casing 131 in its bearings 132 and 133.

A gear 134 is positively keyed to the differential gear casing 131, for rotation therewith, and comprises the drive output from the fine feed motor 17, through the fine feed differential 118.

It is to be noted that the number of teeth on the range gear 115 and the range gear 116 may be selected for the ratio desired by the equation:

$$\frac{2 \text{ (number of teeth in range gear 116 minus number of teeth in range gear 115)}}{\text{number of teeth in range gear 115}} = \text{ratio}$$

The gear 134 on the differential gear casing 118 is in mesh with a gear 135 carried by a rapid feed pinion shaft 136, for rotation therewith.

An input shaft 138 from the rapid feed motor 115 carries a gear 137 in mesh with a gear 140 carried by a reduction gear set pinion shaft 141 of a rapid feed differential, generally designated by the numeral 142.

The shaft 136 is journalled in bearings 143 and 144. Similarly, the shaft 141 is journalled in a pair of bearings 145 and 146. The shafts 136 and 141 carry at their inner ends thereof, bevel pinion gears 147 and 148 respectively. The gears 147 and 148 are in mesh with a bevel idler gear 150 which is mounted for rotation with an idler shaft 151, which is in turn journalled in bearings 152 and 153. The bearings 143, 144, 145, 146, 152 and 153 are housed in a rapid feed gear casing 154.

The rapid fed gear casing 154 is journalled in a pair of bearings 155 and 156, which are, in turn, housed within the wall portions 105 and 106, respectively. The rapid feed gear casing 154 is thus adapted for rotation within the housing 92. A gear 157 is provided, keyed or otherwise secured to the casing 154 for rotation therewith. The gear 157 is in mesh with a gear 159 carried by and keyed or otherwise secured to a transmission output shaft 158, for rotation therewith. The shaft 158 is provided with a longitudinal bore 160, and is journalled in a pair of bearings 161 and 162, which, in turn, are housed within respective wall portions 105 and 106.

The shaft 52 of the lead screw 50 is provided at its left-most end, as viewed in FIGURE 8, with splines 163, which are securely engaged within the bore 160 of the output shaft 158, whereby rotation of the rapid feed gear casing 154 is operative through the gears 157 and 159, to rotate the output shaft 158, and consequently rotate the lead screw 50.

When the rapid feed motor 15 is actuated, or otherwise energized, the brake 18 associated with the fine feed motor 17 is simultaneously actuated, to prevent rotation of the shaft 98, locking the same in its position at that given time. Consequently, the gears 100, 101, 107, 108, 115, 116, 110, 123, 126, 127, 134, 135 and 147 are locked against rotation. Thus, the rapid feed motor 15 is operative through its shaft 138, to rotate the gear 137, which drives the gear 140. Because the gear 140 is splined or otherwise engaged with the shaft 141, the gear 148 is also rotated, and because the gear 147 is in a fixed position and the gear 148 is rotated, the relative movement between the gears 147 and 148 is operative to rotate the gear 150 at the same speed as the gear 148, which causes a rotation of the idler shaft 151, and consequently of the rapid feed gear casing 154 about the common longitudinal axis of the shafts 136 and 141. This rotation of the rapid feed gear casing 154 is operative to drive the lead screw, in the above-described manner, through the gears 157, 159, the output shaft 160, and the shaft portion 52 of the lead screw 50. The lead screw 50 is thus rotated at a rapid rate.

When the fine feed motor 17 is to be operative to drive the lead screw 50 at a lesser rate of speed, the motor brake 16 associated with the rapid motor 15 is operative to lock the gears 137, 140, and 148 against rotation.

The fine feed motor 17 is thus operative through its shaft 98, the gears 100, 101, 107, 108, 110, 115, 116, 123, 126, and 127 to rotate the differential gear casing 131. Consequently, the gear 134 is rotated which drives the gear 135 carried by the pinion shaft 136. The rotation of the shaft 136 causes rotation of the bevel gear 147, which cooperates with the bevel gear 148 which is fixed against movement, whereby the relative movement between the gears 147 and 148 causes rotation of the idler bevel gear 150, at the same speed as that of gear 147, which in turn causes rotation of the differential gear casing 154. The gear 157 keyed to the rapid feed gear casing 154 is then operative through the gear 159 and the transmission output shaft 160 to transmit driving torque to the lead screw 50, at the desired fine rate of speed.

It is to be noted that the range gears 115 and 116 fix the fine feed ratio according to the above-disclosed formula, and that the gears 100 and 101 are operative as change gears, to effect minor ratio changes within the preselected fine feed range afforded by the range gears 115 and 116, as desired.

The differential means 118 and rapid feed reduction gear set 142 are generally similar in construction, thereby facilitating the economy of manufacture of the transmission 13 of this invention. Additionally, the transmission 13 is particularly adapted for extremely large reductions due to the gearing associated with the fine feed motor 17, and in particular, due to the selection of differences in the number of teeth on the range gears 115 and 116, which is reflected in the relative speeds in different directions of the bevel gears 123 and 126 of the first differential mechanism 118.

FEED SLIDE OPERATION

The feed slide 53 is adapted to receive mounted thereon any of a plurality of machine tools units, such as are adapted to accomplish motor operated drilling, reaming, tapping, counter-boring, milling and the like operations (not shown). Furthermore, conditions of tolerance dictated by a work piece (not shown) to be machined demand that the movement of the tool mounted on the feed slide 53 be precisely controlled.

Accordingly, the operation of the feed slide 53 is cyclic, from the extreme leftward position illustrated in FIGURE 1, movable to the extreme right end of the base 20 and is returned to the left end of the base 20, again as viewed in FIGURE 1. This reflects a complete cycle of operation of the feed slide 53, which includes a plurality of sub-cycles. These sub-cycles are a rapid advance of the feed slide 53 toward the right end of the machine as viewed in FIGURE 1, a fine feed of the slide 53 at the right end of the machine, and a rapid leftward return of the feed slide 53, to the original position thereof illustrated in FIGURE 1.

As the feed slide 53 begins its initial rightward, or forward movement, the rapid advance motor 15 is operative, and the fine feed motor brake 18 is operative, locking the fine feed motor and gearing means in fixed positions. The rapid feed motor 15 thus operates in the above-described manner, upon closing of a hand switch (not shown) to energize the rapid advance motor 15 to drive the feed slide 53 and the fine feed cam 70 in a forward direction, whereby a forward edge of the cam 70 contacts the roller 81 carried on a lever 80 of the fine feed limit switch 76, thereby closing the normally open switch 76 by closing contacts thereof, and deenergizing the rapid advance motor 15, as well as applying the rapid advance motor brake 16 to stop rotation of the rapid advance motor 15, with the motor brake 16 maintaining a pre-set torque on the rapid advance motor shaft 137. Additionally, upon closing the fine feed switch 76, the fine feed motor 17 is energized and its associated motor brake 18 is concurrently disengaged whereby the feed slide 53 is moved forward at a reduced controlled linear feed.

As the feed slide 53 moves forward the rapid return cam 71 contacts the roller 88 carried by the arm 86 of the limit switch 78, and moves the switch 78 from a normally open position whereby contacts within the switch 78 are closed and the fine feed motor 17 is de-energized. Simultaneously therewith, the switch 78 is operative to apply the fine feed motor brake 18 to stop rotation of the fine feed motor shaft 98 and maintain a preset torque on the motor shaft 98. Even further, upon closing of the switch 78 by contact of the cam 71 against the roller 88, the rapid feed motor 15 is energized for rapid return rotation, as by reversing polarity or the like, and associated motor brake 16 is disengaged. The feed slide 53 is thus driven in a rapid return movement, having a rearward linear movement (to the left as viewed in FIGURE 1) at a maximum linear feed. The feed slide 53 continues its rearward movement until the synchronizing cam 72 strikes the roller 83 attached to the lever arm 82 of the synchronizing limit switch 77, moving the contacts within the switch 77 from a normally closed position, to an open position for deenergizing the motor 15 and its associated motor brake 16 to stop the reverse rotation of the motor shaft 137. During the terminal rearward movement of the feed slide 53, the rapid return reset cam 73 strikes the roller 87 on the arm 85 of the rapid return limit switch 78, reversing the polarity of the motor 15 to its original direction of forward drive of the feed slide 53. This completes the cycle of operation of the feed slide 53.

It is to be noted that the synchronizing limit switch 77 is adapted to be used for shutting down the operation of the machine 10 after a complete cycle of operation as well as to provide a signal that machine 10 has completed its cycle. To initiate a new machine 10 cycle, the open contacts on the synchronizing limit switch 77 are bypassed by closing and holding the hand switch (not shown) until the forward movement of the synchronizing cam 72 on the feed slide 53 releases the synchronizing limit switch 77 to its normally closed position.

Should the limit switch 78 cease to operate in the intended manner, and the feed slide 53 be driven toward the right a greater distance than that predetermined for the normal operation of the feed slide 53, the abutment stop button 66 mounted on the member 64 will engage the pin 47, thereby terminating the forward movement of the feed slide 53 and transmitting an extremely large resistance to the torque applied by either of the driving motors 15 or 17. Similarly an extremely large resistance to the driving torque would be effected by abutment of the extreme forward end of the lead screw 53 with the rearward end of the stop button carrier member 64. In either situation, if the resistance to the driving torque exceeds a predetermined and preset level the applicable motor brake 16 or 18 is automatically actuated to prevent further rotation of the associated motor shafts 98 and 137 respectively. Thus, the maximum thrust for the feed slide 53 beyond which the torque load exceeds the predetermined level and the brakes are operative is independent of any feed ratio employed.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A torque transmission device comprising at least two drive means, output means, a brake for each drive means, two parallel power paths extending between one drive means and two elements of a first planetary gear set, two further power paths, one of said further power paths extending from an output element of said first planetary set through a reduction gear set to said output means, and the other of said two further power paths extending from the second drive means through said reduction gear set to said output means.

2. A torque transmission device as defined in claim 1 including means in said two parallel power paths for rotating said two elements of said first planetary gear set at different rates, said first planetary gear set including a third element driven by said two elements, said third element rotating at a rate determined by the difference between the rates of rotation of said two elements, and said third element being adapted to transmit torque to said output element of said first planetary set.

3. A torque transmission device as defined in claim 2 wherein said first planetary gear set is a differential transmission, said two elements being differential drive gears, and said third element being a differential idler gear.

4. A torque transmission device as defined in claim 3 wherein said drive gears have a common axis of rotation, and said idler gear rotates about an axis disposed normal to said common axis.

5. A torque transmission device as defined in claim 1 wherein said reduction gear set is a planetary gear set having first and second driving elements and a driven element communicating with said output means, said first driving element being adapted to transmit torque carried by said one of said further power paths to said driven element, and said second driving element being adapted to transmit torque carried by said other of said further power paths to said driven element.

6. A torque transmission device as defined in claim 5 including means rendering one of said driving elements inoperative while the other of said driving elements is transmitting torque to said driven element.

7. a torque transmission device as defined in claim 1 including means operable to actuate a brake associated with one of said drive means to prevent transmission of torque through the power paths extending from said drive means while torque is being transmitted from the other of said drive means to said output means.

8. A torque transmission device as defined in claim 1 wherein said first planetary gear set and said reduction gear set are each carried in a rotatable casing, and gear means mounted on said casings for operatively connecting an associated gear set to said output means.

9. A drive transmission for a machine tool or like unit comprising a machine base, a movable feed slide, a lead screw for moving said feed slide, a fine feed motor for driving said lead screw, a rapid feed motor for driving said lead screw, brake means associated with each of said motors, two parallel power paths extending from said fine feed motor to a differential gear set, an output element associated with said differential gear set operatively connected through a reduction gear set with said lead screw, another power path extending from said rapid feed motor through said reduction gear set to said lead screw, and means for actuating a brake associated with one of said motors to render said one motor inoperative while said lead screw is being driven by the other one of said motors.

References Cited

UNITED STATES PATENTS

| | | | |
|---|---|---|---|
| 2,519,042 | 8/1950 | Granberg et al. | 74—675 X |
| 2,682,785 | 7/1954 | Cerutti et al. | 74—777 X |
| 3,182,526 | 5/1965 | Zajac | 74—675 |
| 3,283,664 | 11/1966 | Cross et al. | 74—675 X |
| 3,357,225 | 12/1967 | Grube | 74—675 X |

FOREIGN PATENTS 856,308  11/1952  Germany.

DONLEY J. STOCKING, Primary Examiner

T. C. PERRY, Assistant Examiner

U.S. Cl. X.R.

74—756; 77—32; 90—14